US012614570B2

(12) United States Patent

Marchon et al.

(10) Patent No.: US 12,614,570 B2

(45) Date of Patent: Apr. 28, 2026

(54) MITIGATING OXYGEN DEPLETION IN SEALED ENCLOSURE HEAT ASSISTED MAGNETIC RECORDING DISK DRIVES

(71) Applicant: Seagate Technology LLC, Fremont, CA (US)

(72) Inventors: Bruno Marchon, Palo Alto, CA (US); Rory Stephen Goodman, Boulder, CO (US); Dipeshkumar J. Purani, Shakopee, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 18/936,107

(22) Filed: Nov. 4, 2024

(65) Prior Publication Data

US 2025/0182794 A1 Jun. 5, 2025

Related U.S. Application Data

(60) Provisional application No. 63/605,789, filed on Dec. 4, 2023.

(51) Int. Cl.
| | |
|---|---|
| *G11B 33/14* | (2006.01) |
| *G11B 5/55* | (2006.01) |
| *G11B 19/20* | (2006.01) |
| *G11B 5/00* | (2006.01) |

(52) U.S. Cl.
CPC ........ *G11B 33/1406* (2013.01); *G11B 5/5573* (2013.01); *G11B 19/2009* (2013.01); *G11B 33/1446* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 5,459,362 | A * | 10/1995 | Dunfield et al. ..... | G11B 5/5521 |
| | | | | 310/154.29 |
| 5,659,215 | A * | 8/1997 | Dunfield et al. ..... | G11B 5/5521 |
| | | | | 310/154.29 |
| 6,411,463 | B1 * | 6/2002 | Janik et al. .......... | G11B 25/043 |
| | | | | 360/97.19 |
| 7,854,552 | B2 * | 12/2010 | Hino et al. .......... | F16C 33/1085 |
| | | | | 310/90 |
| 8,885,287 | B1 * | 11/2014 | Koike et al. ....... | G11B 33/1446 |
| | | | | 360/97.12 |
| 10,468,071 | B1 | 11/2019 | Tasaka et al. | |
| 10,734,035 | B1 | 8/2020 | Sun et al. | |
| 11,069,383 | B1 * | 7/2021 | Tsoukatos et al. .. | G11B 25/043 |

(Continued)

*Primary Examiner* — Craig A. Renner
(74) *Attorney, Agent, or Firm* — Mueting Raasch Group

(57) ABSTRACT

Disclosed are sealed enclosure HAMR hard drives, and methods for use therewith, that reduce the rate of depletion of gaseous Oxygen within the sealed HAMR drive enclosure, thereby leaving an amount of Oxygen available for mitigation of the effects of carbonaceous residue formation, thus extending the useful life of the HAMR drive. In sealed enclosure HAMR hard drives that include a component having a NdFeB alloy magnet, the sealed enclosure is filled with a gas mixture that includes primarily Helium along with a sufficient amount of Oxygen to mitigate carbonaceous residue formation during the lifetime of the drive and a sufficient amount of Nitrogen to reduce the rate of Oxygen depletion due to oxidation of the NdFeB magnet.

20 Claims, 2 Drawing Sheets

(56) References Cited

U.S. PATENT DOCUMENTS

| | | | |
|---|---|---|---|
| 11,238,891 B1 * | 2/2022 | Zuckerman et al. | .. G11B 5/607 |
| 2004/0232782 A1 * | 11/2004 | Xu et al. ............ | G11B 19/2009 |
| | | | 310/67 R |
| 2020/0402546 A1 * | 12/2020 | Coffey ................ | C21D 9/0068 |
| 2021/0005226 A1 * | 1/2021 | Castaneda et al. ......................... | |
| | | | G11B 33/1446 |
| 2021/0142831 A1 * | 5/2021 | Tsoukatos et al. .. | G11B 33/144 |
| 2022/0013940 A1 * | 1/2022 | Peterson et al. ..... | G11B 25/043 |
| 2022/0284931 A1 * | 9/2022 | Tee et al. ........... | G11B 33/1466 |
| 2023/0154501 A1 * | 5/2023 | Liu et al. ............. | G11B 33/148 |
| | | | 360/265.9 |
| 2023/0225074 A1 * | 7/2023 | Tsoukatos et al. .. | G11B 33/142 |
| | | | 361/695 |
| 2025/0070602 A1 * | 2/2025 | Suzuki .............. | G11B 19/2009 |

* cited by examiner

MITIGATING OXYGEN DEPLETION IN SEALED ENCLOSURE HEAT ASSISTED MAGNETIC RECORDING DISK DRIVES

CROSS REFERENCE TO RELATED APPLICATIONS

This application claims the benefit of 63/605,789, filed Dec. 4, 2023, the disclosure of which is incorporated by reference herein in its entirety.

TECHNICAL FIELD

The disclosure relates to heat assisted magnetic recording hard disk drives having sealed enclosures.

BACKGROUND

Storage density in hard disk drives (HDD) continues to increase. Areal density in shipped products exceeds one terabit per square inch ($Tb/in^2$), with densities approaching 5 $Tb/in^2$ being possible in the near future. As a result, there is constant need to develop technologies relating to magnetic disks and recording heads that can sustain a recorded bit size approaching 10 to 20 nanometers in size. Heat Assisted Magnetic Recording (HAMR) technology allows for increased bit stability in the nanoscopic domain, but integrating HAMR technology into hard drives can be challenging.

SUMMARY

The present disclosure relates to methods for use with sealed enclosure HAMR hard drives that include a NdFeB alloy magnet. In certain aspects, such methods include filling the sealed enclosure with a gas mixture that includes Helium and Oxygen, the Helium present in the gas mixture in an amount of at least 90% by volume. Such methods can further include exposing the magnet to an amount of Nitrogen sufficient to reduce an Oxygen depletion rate within the sealed enclosure.

In certain aspects, exposing the magnet to Nitrogen includes exposing the magnet material to Nitrogen gas during annealing of the magnet material and prior to placing the magnet within the sealed enclosure.

In certain aspects, exposing the magnet to Nitrogen includes adding Nitrogen to the gas mixture used to fill the sealed enclosure. For example, the gas mixture used to fill the sealed enclosure is composed of Helium in an amount of (100–x–y) % by volume, Oxygen in an amount of x % by volume, and Nitrogen in an amount of y % by volume, where x is greater than 0 and less than 10, where y is greater than 0, and where x+y is less than 10.

In certain aspects of methods disclosed herein, the Oxygen depletion rate is reduced such that the sealed enclosure maintains a sufficient amount of gaseous Oxygen to react with organic residues within the sealed enclosure over a span of more than 4 years, preferably 5 or more years, of normal operation of the HAMR hard drive and under average operating temperatures of 62C or less.

The present disclosure further relates to sealed enclosure HAMR hard drives comprising at least one component that includes a NdFeB magnet. Such a component may be a voice coil motor or a spindle motor, for example. The sealed enclosure is filled with a gas mixture including Helium, Oxygen, and Nitrogen, the Helium present in an amount of at least 90% by volume. The sealed enclosure of the HAMR hard drive maintains a sufficient amount of Oxygen to react with organic residues within the sealed enclosure over a span of more than 4 years, preferably 5 or more years, of normal operation of the HAMR hard drive and under average operating temperatures of 62C or less.

In certain aspects, the NdFeB magnet is pre-treated by exposure to Nitrogen gas prior to placing in the sealed enclosure. In certain aspects, the NdFeB magnet is Nickel plated or epoxy coated.

Preferably, at the time of sealing the sealed enclosure, the initial gas mixture is composed of Helium in an amount of (100–x–y) % by volume, Oxygen in an amount of x % by volume, and Nitrogen in an amount of y % by volume, where x is greater than 0 and less than 10, where y is greater than 0, and where x+y is less than 10.

These and other features and aspects of various examples may be understood in view of the following detailed discussion and accompanying drawings.

DETAILED DESCRIPTION

The present disclosure relates to sealed enclosure HAMR drives and methods for use therewith that reduce the rate of depletion of gaseous Oxygen within the sealed drive enclosure, thereby leaving an amount of Oxygen available for mitigation of the effects of carbonaceous residue formation, thus extending the useful life of the HAMR drive.

In heat-assisted magnetic recording (HAMR) disk drives, the surface of the recording media is elevated up to 500C or more during writing. Without wishing to be bound by any theory, it has been observed that organic residues present at the HAMR head-disk interface can act as optical absorbers of near-field infrared light and thereby interfere with optimal HAMR drive operations. These organic residues, also referred to as carbonaceous residues or "smear," are believed to originate from the thermal decomposition of volatile organic compounds within the drive enclosure. The deleterious effects of these organic residues have been found to be effectively mitigated when Oxygen is allowed to react with the organic residues.

Figure 1:
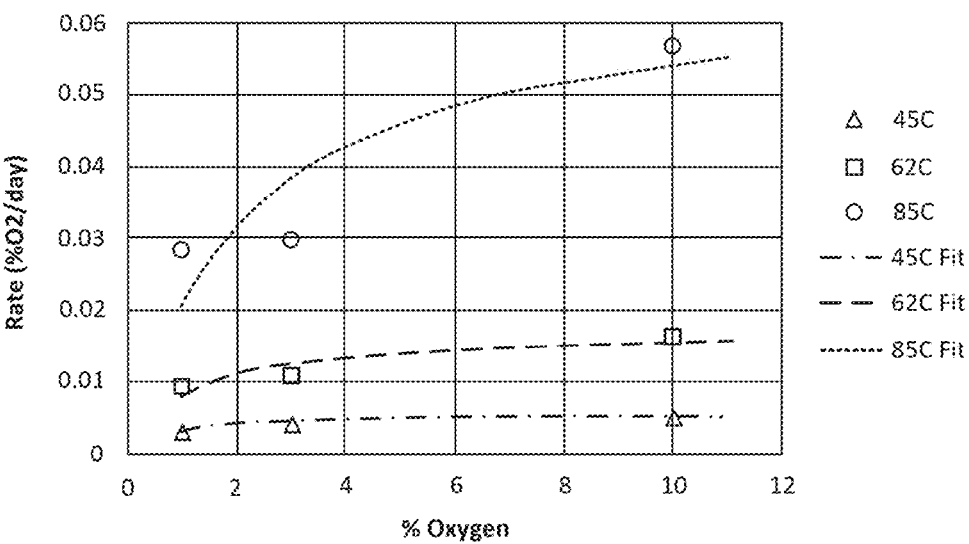
FIG. 1 is chart depicting initial Oxygen depletion rate versus initial Oxygen fill level for a series of different average operating temperatures as observed in test HAMR drives.
Figure 2:
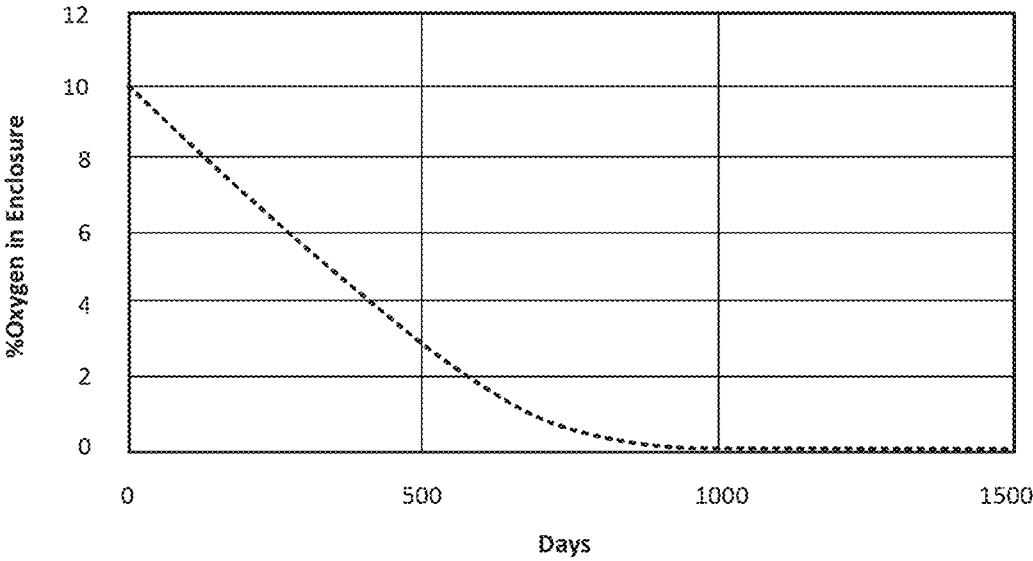
FIG. 2 is a chart depicting expected depletion of gaseous Oxygen over time in a test HAMR drive operating under normal conditions and at an average operating temperature of 62C.

HAMR drives are often implemented in a sealed enclosure that is filled primarily with an inert gas such as Helium. To help reduce the effects of smear, a small percentage of Oxygen can be introduced into the sealed helium drive environment. However, other components within the drive may be susceptible to reacting with Oxygen, thereby depleting an amount of Oxygen that would have otherwise been available to mitigate carbonaceous residue. For example, as seen in FIG. 1, the initial rate of Oxygen depletion measured during testing of similarly-constructed sealed HAMR drives is plotted as a function of the initial Oxygen content and for three different average operating temperatures. A fit to the data, using a surface reaction model, is also plotted. From these test observations, it is estimated that nearly all the gaseous Oxygen will be depleted from a sealed drive in less than 3 years under normal operating conditions and at typical HAMR hard drive average operating temperatures of 62C, as shown in FIG. 2.

Reducing the rate of Oxygen depletion allows more gaseous Oxygen to be available for a longer period of time to mitigate carbonaceous residue, and may also allow the use of a lower initial amount of Oxygen in the Helium mixture, or other inert gas mixture, used to fill the sealed HAMR hard drive.

One type of hard drive component that can contribute to Oxygen depletion includes magnets such as the Neodymium-Iron-Boron (NdFeB) magnets typically used in voice-coil motors (VCM) that control the movement of recording head actuators, as well as in the spindle motors that control the spinning of the magnetic recording disks. The NdFeB alloys used in such magnets are prone to corrosion, and thus are often coated with a electroplated Nickel layer or with a thin layer of Copper sandwiched in a Nickel film that covers the magnet. NdFeB magnets can also be coated with or encapsulated in an epoxy to reduce corrosion. However, such coated magnets may still be prone to corrosion, and thus lead to increased Oxygen depletion rates.

Using even small amounts of Nitrogen to treat NdFeB alloys can significantly lower corrosion rates. For example, Nitrogen may be used to passivate sub-stoichiometric Neodymium oxides that reside at the grain boundaries in NdFeB magnet materials by creating Neodymium Nitride. As such, Oxygen depletion can be mitigated by introducing an effective amount of gaseous Nitrogen to treat the NdFeB magnet materials, either during an annealing process or other metallurgical process when forming the magnet, or during the process of filling the sealed HAMR drive.

Figure 3:
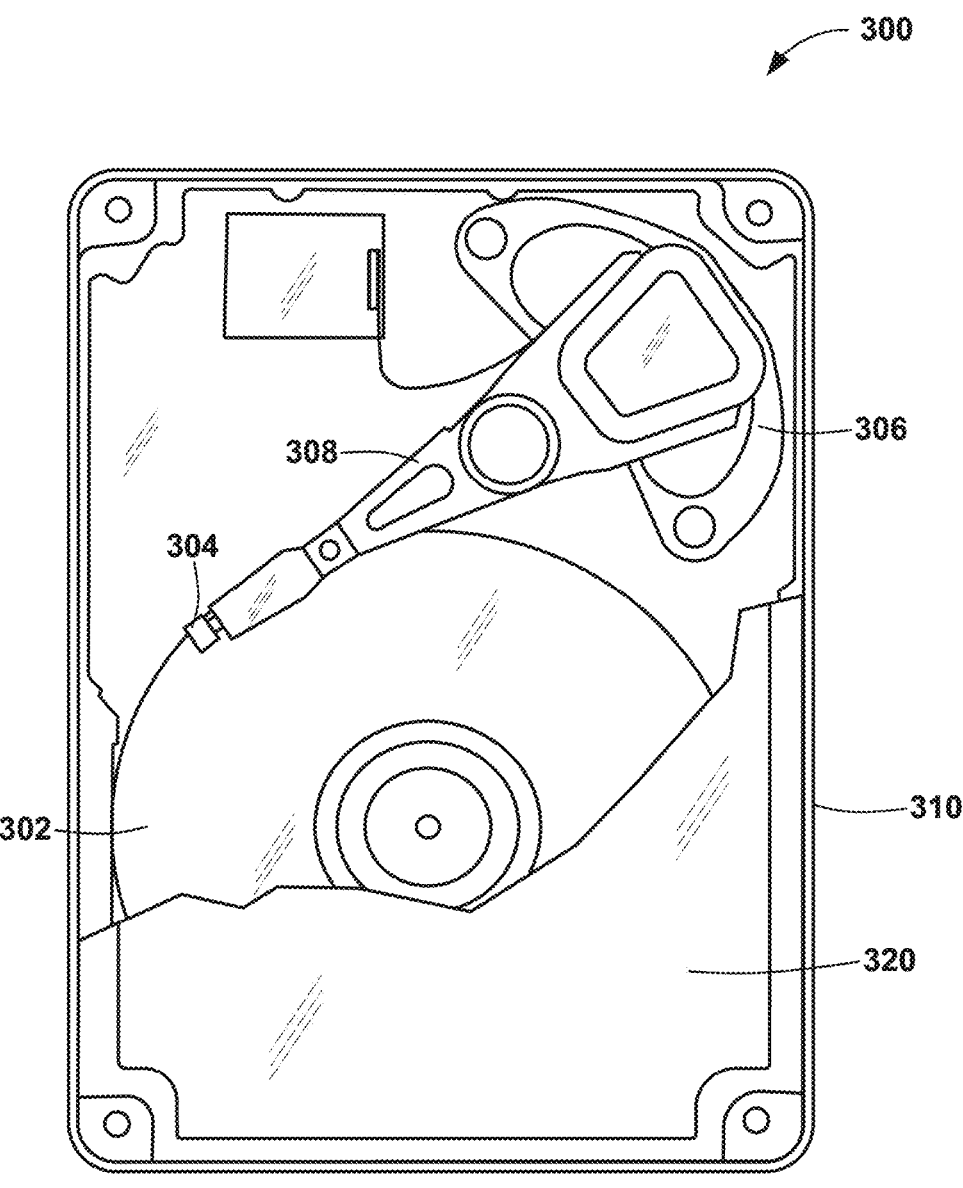
FIG. 3 is a schematic drawing of a sealed enclosure HAMR hard drive with the top cover cut away to indicate internal components.

FIG. 3 schematically shows a sealed enclosure HAMR hard drive 300. Enclosure 310 includes a top cover 320 that is cut away to indicate various internal components. The sealed enclosure 310 contains magnetic recording media 302 in the form of one or more disks, a recording head (or slider on which a recording head is mounted) 304 including components to write data to and read data from the media 302, and an actuator arm 308 on the end of which is the recording head 304. The movement of the actuator arm 308 is controlled by a voice coil motor (VCM), a component of which is VCM magnet 306. VCM magnet 306 may be composed of a NdFeB alloy. Other components in a hard drive may also include NdFeB magnets, such as the spindle motor (not indicated in FIG. 3) that spins the magnetic recording media disks.

When filling the sealed enclosure of a HAMR drive in accordance with aspects of the present disclosure, a mixture can be used that includes gaseous Nitrogen added to an inert gas, such as Helium, along with Oxygen. The addition of Nitrogen is expected to reduced the Oxygen depletion rate since Nitrogen is available to react with NdFEB magnet materials. Thus, gaseous Oxygen remains available for longer over the lifetime of the HAMR drive, even if a smaller amount of Oxygen is used in the initial filling mixture as compared to what would be required if Nitrogen was not added. While the presence of more Oxygen in the filling mixture can ensure that Oxygen is available to mitigate carbonaceous residue formation, the presence of less Oxygen can be beneficial to drive operations, including the reduction of disk flutter.

In certain embodiments, the gaseous mixture used to fill the sealed enclosure is composed of Helium in an amount by volume of (100−x−y) %, Oxygen in an amount by volume of x %, and Nitrogen in an amount by volume of y %, where x is greater than 0, y is greater than 0, and x+y is no more than about 10. Preferably, x is in a range of about 1 to 10, x+y is less than 10. In certain embodiments, y is no greater than x. By way of non-limiting example, possible specific implementations of x,y pairs include: (x,y)=(5,3); (x,y)=(3, 2); and (x,y)=(2,1).

Alternatively or in addition to including Nitrogen in the gaseous mixture filling the sealed enclosure of the HAMR drive, the NdFeB alloy used to make the magnets can be exposed to Nitrogen prior to being assembled into the HAMR drive. For example, in the manufacture of NdFeB magnets, the alloy is first cast, reduced to powder, and finally pressed and sintered in Argon or in vacuum. Introducing a small amount of Nitrogen in the metallurgy can be beneficial to corrosion robustness, and therefore help prevent Oxygen depletion in the HAMR drive when NdFeB magnets made in this manner are used. Also, during magnet fabrication and processing, incorporating a small amount of Nitrogen in the chamber during annealing of the NdFeB magnets can be beneficial, for example including Nitrogen in the anneal chamber in an amount of about 1 to 10% by volume.

It should be understood that various aspects disclosed herein may be combined in different ways than the combinations specifically presented in the description and accompanying drawings. It should also be understood that, depending on the example, certain acts or events of any of the processes or methods described herein may be performed in a different sequence, may be added, merged, or left out altogether. In addition, while certain aspects of this disclosure are described as being performed by a single module or unit for purposes of clarity, it should be understood that the techniques of this disclosure may be performed by a combination of units or modules.

As used herein, the term "or" refers to an inclusive definition, for example, to mean "and/or" unless its context of usage clearly dictates otherwise. The term "and/or" refers to one or all of the listed elements or a combination of at least two of the listed elements.

As used herein, the phrases "at least one of" and "one or more of" followed by a list of elements refers to one or more of any of the elements listed or any combination of one or more of the elements listed.

As used herein, the terms "coupled" or "connected" refer to at least two elements being attached to each other either directly or indirectly. An indirect coupling may include one or more other elements between the at least two elements being attached. Further, in one or more embodiments, one element "on" another element may be directly or indirectly on and may include intermediate components or layers therebetween. Either term may be modified by "operatively" and "operably," which may be used interchangeably, to describe that the coupling or connection is configured to allow the components to interact to carry out described or otherwise known functionality. For example, a controller may be operably coupled to a resistive heating element to allow the controller to provide an electrical current to the heating element.

As used herein, any term related to position or orientation, such as "proximal," "distal," "end," "outer," "inner," and the like, refers to a relative position and does not limit the absolute orientation of an embodiment unless its context of usage clearly dictates otherwise.

All scientific and technical terms used herein have meanings commonly used in the art unless otherwise specified. The definitions provided herein are to facilitate understanding of certain terms used frequently herein and are not meant to limit the scope of the present disclosure.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

What is claimed is:

1. A method for use with a heat-assisted magnetic recording (HAMR) hard drive that includes a sealed enclosure containing a magnet comprising a NdFeB alloy, the method comprising:

filling the sealed enclosure with a gas mixture comprising Helium and Oxygen, the Helium present in the gas mixture in an amount of at least 90% by volume; and exposing the magnet to an amount of Nitrogen sufficient to reduce an Oxygen depletion rate within the sealed enclosure, wherein exposing the magnet to Nitrogen comprises exposing the NdFeB alloy to Nitrogen gas during annealing of the NdFeB alloy prior to placing the magnet within the sealed enclosure.

2. The method of claim 1, further comprising adding Nitrogen to the gas mixture used to fill the sealed enclosure.

3. The method of claim 2, wherein the gas mixture is comprised essentially of Helium in an amount of (100−x−y) % by volume, Oxygen in an amount of x % by volume, and Nitrogen in an amount of y % by volume, where x is greater than 0 and less than 10, where y is greater than 0, and where x+y is less than 10.

4. The method of claim 3, wherein x is about 1 or greater.

5. The method of claim 3, wherein x is in a range of about 3 to about 5, and y is in a range of about 1 to about 3.

6. The method of claim 3, wherein y is no greater than x.

7. The method of claim 1, wherein the Oxygen depletion rate is such that the sealed enclosure maintains a sufficient amount of gaseous Oxygen to react with organic residues within the sealed enclosure over a span of more than 4 years of normal operation of the HAMR hard drive and under average operating temperatures of 62C or less.

8. The method of claim 1, wherein the magnet is Nickel plated or epoxy coated.

9. The method of claim 1, wherein the magnet is a voice coil motor magnet.

10. The method of claim 1, wherein the magnet is a spindle motor magnet.

11. A heat-assisted magnetic recording (HAMR) hard drive comprising:

a sealed enclosure containing operational components of the HAMR hard drive, the operational components including a NdFeB magnet; and a gas mixture filling the sealed enclosure, wherein at the time of sealing the sealed enclosure the gas mixture comprised Helium, Oxygen, and Nitrogen, the Helium present in an amount of (100−x−y) % by volume, the Oxygen present in an amount of x % by volume, and the Nitrogen present in an amount of y % by volume, where x is greater than 0 and less than 10, where y is greater than 0 and no greater than x, and where x+y is less than 10, wherein the sealed enclosure maintains a sufficient amount of Oxygen to react with organic residues within the sealed enclosure over a span of more than 4 years of normal operation of the HAMR hard drive and under average operating temperatures of 62C or less.

12. The HAMR hard drive of claim 11, wherein the NdFeB magnet was pre-treated by exposure to Nitrogen gas prior to placing in the sealed enclosure.

13. The HAMR hard drive of claim 1, wherein the NdFeB magnet is Nickel plated or epoxy coated.

14. The HAMR hard drive of claim 11, wherein the NdFeB magnet is a voice coil motor magnet.

15. The HAMR hard drive of claim 11, wherein the NdFeB magnet is a spindle motor magnet.

16. The HAMR hard drive of claim 11, wherein x is about 1 or greater.

17. The HAMR hard drive of claim 11, wherein x is in a range of about 3 to about 5, and y is in a range of about 1 to about 3.

18. A method for use with a heat-assisted magnetic recording (HAMR) hard drive that includes a sealed enclosure containing a magnet comprising a NdFeB alloy, the method comprising:

filling the sealed enclosure with a gas mixture comprising Helium in an amount of (100−x−y) % by volume, Oxygen in an amount of x % by volume, and Nitrogen in an amount of y % by volume, where x is greater than 0 and less than 10, where y is greater than 0 and no greater than x, and where x+y is less than 10; and exposing the magnet to an amount of Nitrogen sufficient to reduce an Oxygen depletion rate within the sealed enclosure.

19. The method of claim 18, wherein x is in a range of about 3 to about 5, and y is in a range of about 1 to about 3.

20. The method of claim 18, wherein exposing the magnet to an amount of Nitrogen sufficient to reduce an Oxygen depletion rate within the sealed enclosure is accomplished by filling the sealed enclosure with the gas mixture.

* * * * *